United States Patent
Mikhaylov et al.

(10) Patent No.: US 10,747,405 B2
(45) Date of Patent: Aug. 18, 2020

(54) METHOD OF RECEIVING USER-COMMAND BY PROCESSOR OF ELECTRONIC DEVICE VIA TOUCHSCREEN OF ELECTRONIC DEVICE

(71) Applicant: YANDEX EUROPE AG, Lucerne (CH)

(72) Inventors: Aleksandr Aleksandrovich Mikhaylov, Moscow (RU); Aleksey Sergeevich Shimov, Kostroma (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 16/268,639

(22) Filed: Feb. 6, 2019

(65) Prior Publication Data
US 2020/0012389 A1     Jan. 9, 2020

(30) Foreign Application Priority Data
Jul. 3, 2018   (RU) ................................ 2018124343

(51) Int. Cl.
  *G06F 3/0482*     (2013.01)
  *G06F 3/0485*     (2013.01)
  *G06F 3/0488*     (2013.01)
  *G06F 3/0484*     (2013.01)
  (Continued)

(52) U.S. Cl.
  CPC .......... *G06F 3/0482* (2013.01); *G01C 21/367* (2013.01); *G01C 21/3644* (2013.01); *G01C 21/3664* (2013.01); *G06F 3/0485* (2013.01); *G06F 3/04845* (2013.01);
  (Continued)

(58) Field of Classification Search
  CPC ...... G06F 3/0482; G06F 3/0485; G06F 3/167; G01C 21/3644; G01C 21/3664
  See application file for complete search history.

(56) References Cited

U.S. PATENT DOCUMENTS

| 7,155,339 B2 | 12/2006 | Tu |
| 8,626,230 B2 | 1/2014 | Raab et al. |
| 8,831,873 B2 | 9/2014 | Tamayama et al. |

(Continued)

FOREIGN PATENT DOCUMENTS

| DE | 102007037938 A1 | 2/2009 |
| RU | 2014128981 A | 10/2016 |

OTHER PUBLICATIONS

Russian Search Report dated Aug. 28, 2019 in connection with the priority application RU2018124343.

*Primary Examiner* — Tadesse Hailu
(74) *Attorney, Agent, or Firm* — BCF LLP

(57) ABSTRACT

A method of receiving a user-command by a processor includes displaying on a touchscreen a graphical user interface (GUI). The GUI includes a map view and an interactive menu. The map view has displayed thereon a map of a geographical area, and a route. The route has at least two Points of Interest (POIs) sequentially located along the route. A first one of the POIs is an in-focus one. A second one of the POIs is an out-of-focus one. The interactive menu has displayed thereon a first POI card associated with the first POI. The first POI card is changeable with a second POI card, which is associated with the second POI. In response to a user interaction with the interactive menu, focus is changed from the first POI card to the second POI card, and from the first POI to the second POI.

19 Claims, 8 Drawing Sheets

(51) Int. Cl.
*G01C 21/36* (2006.01)
*G06F 3/16* (2006.01)
(52) U.S. Cl.
CPC .......... *G06F 3/04883* (2013.01); *G06F 3/167* (2013.01); *G06F 2203/04804* (2013.01)

(56) References Cited

U.S. PATENT DOCUMENTS

| | | |
|---|---|---|
| 9,228,849 B2 | 1/2016 | Beyeler et al. |
| 9,464,909 B2 | 10/2016 | Chen et al. |
| 9,651,392 B2 | 5/2017 | Gearhart et al. |
| 2002/0138196 A1 | 9/2002 | Polidi et al. |
| 2005/0021227 A1* | 1/2005 | Matsumoto ........ G01C 21/3415 701/431 |
| 2009/0171578 A1* | 7/2009 | Kim .................. G01C 21/3632 701/414 |
| 2010/0305842 A1 | 12/2010 | Feng et al. |
| 2011/0106429 A1* | 5/2011 | Poppen ............... G01C 21/3617 701/533 |
| 2012/0150436 A1 | 6/2012 | Rossano et al. |
| 2013/0138343 A1 | 5/2013 | Choi |
| 2013/0215155 A1* | 8/2013 | Pasceri ................. G06F 3/0485 345/684 |
| 2013/0322665 A1* | 12/2013 | Bennett ............ G08G 1/096855 381/300 |
| 2014/0032678 A1* | 1/2014 | Koukoumidis ..... G06F 16/9535 709/205 |
| 2014/0359510 A1* | 12/2014 | Graf .................... G01C 21/3614 715/771 |
| 2016/0018232 A1 | 1/2016 | Bankowski et al. |
| 2017/0094360 A1* | 3/2017 | Keighran ........... H04N 21/4318 |
| 2017/0184411 A1* | 6/2017 | Glasgow ........... G01C 21/3415 |
| 2017/0268893 A1* | 9/2017 | Nakanishi ............... G06F 16/29 |
| 2018/0067620 A1* | 3/2018 | Adler .................... G06F 3/0482 |
| 2018/0336007 A1* | 11/2018 | Li ......................... B60W 30/10 |

* cited by examiner

METHOD OF RECEIVING USER-COMMAND BY PROCESSOR OF ELECTRONIC DEVICE VIA TOUCHSCREEN OF ELECTRONIC DEVICE

CROSS-REFERENCE

The present application claims priority to Russian Patent Application No. 2018124343, entitled "Method of Receiving User-Command by Processor of Electronic Device via Touchscreen of Electronic Device," filed Jul. 3, 2018, the entirety of which is incorporated herein by reference.

FIELD OF TECHNOLOGY

The present technology relates to map applications executed in electronic devices and, more specifically, to methods and systems for receiving a user-command via a touchscreen of an electronic device.

BACKGROUND

With recent developments in wireless communication, use of wireless communication devices has become almost ubiquitous. These wireless devices include laptop computers, tablet computers, smart phones, as well as plethora of other wireless devices (car navigation devices, user-wearable navigation devices, and the like). Most, if not all, wireless devices are equipped with geo-position devices (for example, those using GPS technology for determining geo position of the wireless device, those using triangulation techniques, or the like).

Most of these wireless devices are further equipped with mapping and/or navigation applications (jointly referred herein below as a map application). A typical navigation application provides maps of various regions and allows a user to navigate through them. For example, the user can use the navigation application to request directions from the user's position to a Points of Interest (POI). In response, the navigation application will provide the user with one or more possible routes and will guide the user to the POI via one of the routes by providing turn-by-turn driving instructions via a graphical user interface (GUI).

Typically, when a user conducts a search for a POI via a prior art navigation application, the prior art navigation application returns a plurality of results which it presents to the user as a plurality of POI objects, such as pins, representative of the results (POIs) laid out on a map in the GUI. Generally speaking, a POI object is any object that can be overlaid by a map application over the map in the GUI, and which represents the location of a corresponding POI and to which location the user of the electronic device may drive, walk, or commute to using the map application. Examples of POIs include: cities, particular addresses, museums, shopping centers, banks, parks, statutes, government buildings, historical buildings, and the like.

The prior art navigation application then requires the user to look over the POI objects to find a POI to which they want to navigate. To allow the user to do this, the typical prior art navigation application implemented on an electronic device with a touchscreen detects when the user taps on a given one of the POI objects and in response to the tap, brings up information about the POI represented by the given POI object and also brings up what are typically labelled as a "GO" button and a cancel button.

The typical prior art navigation application then requires the user to review the information about the POI represented by the given POI object to determine if that POI is of interest. In cases where it is not, the prior art navigation application requires the user to tap over the cancel button to hide the presented information and then to further review the POI objects on the map and to tap over a next given one of the POI objects. The prior art navigation application detects this subsequent tap and in response brings up information about the POI corresponding to the next one of the POI objects as well as the "GO" and cancel buttons for that next POI object. The prior art navigation application then, again, requires the user to review the information about that next POI to determine if it is of interest.

Once the user finds a desired POI, the prior art navigation application then detects the user's tap over the "GO" button. In response, the prior art navigation application builds a route and starts directing the user to that POI. While the prior art navigation application is guiding the user to that POI, the prior art navigation application can allow the user to search for additional POIs on or off route. For example, where the prior art navigation application is guiding the user from one city to another, the prior art navigation application can display POI objects over the map which are representative of gas stations along or near the route. In such a case, the typical prior art navigation application requires the user to go through a process similar to the initial review of POI search results as described herein above.

That is, the prior art navigation application presents a plurality of POI objects and requires the user to look over them and tap over select ones to find one of interest. Once the additional POI is found, the prior art navigation application typically brings up a menu with two additional buttons. One of the additional buttons asks the user whether they would like to make that additional POI a new destination. The other one of the additional buttons asks the user whether they would like to add that additional POI as a "stop" point on the existing route. The prior art navigation application then detects a tap over one of these buttons and correspondingly either creates a new route or alters the existing route and provides a corresponding new set of driving/walking/commuting directions (as applicable) and a new estimated time of arrival (ETA) to that POI.

For cases where the user then decides that the new or modified route is not desirable and/or simply wishes to find a further different POI to navigate to, the prior art navigation application can detect an additional tap over the map and can in response bring up a cancel button to allow the user to cancel that route. The prior art navigation application then requires the user to go through the same procedure as described herein above in order to discern a new POI out of a plurality of presented potential POIs and to start navigating to that new POI.

SUMMARY

Without wishing to be bound to any specific theory, developers of the present technology have appreciated that prior art navigation applications require a relatively large number of user interactions in order to operate the navigation applications. For example, as described above, a series of taps over the map is required in order to find desired POIs, and then to find a most desired POI out of those POIs. Developers of the present technology have also appreciated that at least some such steps require relatively long attention span times from the user.

Developers of the present technology have yet further appreciated that in some circumstances, and particularly while a user is driving, such attention span times result in the user's vehicle covering material distances while the user's eyes are directed to the navigation screen. That is, distance "D" covered by a vehicle travelling at a speed "V" during time "T" can be represented as: D=V×T. Therefore, the more often and for the longer time periods a navigation application requires a user to direct their eyes to the navigation screen for operating the navigation application while driving, the longer the distances the user may drive while not looking at the road.

Additionally, developers of the present technology have appreciated that prior art touchscreen-based navigation systems require users to repeatedly position one or more fingers and/or hand(s) over the touchscreen in order to operate the prior art navigation applications. For example, as described above, prior art navigation applications require multiple finger taps over POI objects on a map for a user to review different ones of the POIs represented by the POI objects in looking for a desired one of the potential POIs.

The developers have also appreciated that the map of a navigation application typically rotates and/or moves with movement of the user's electronic device (i.e. with movement of the user), and that this, at least in some circumstances such as driving, could make the POI objects difficult for a user to visually track and/or tap over on the moving and pivoting map.

The present technology has been developed based on developers' appreciation that there exists at least one problem associated each given prior art navigation application. The present technology has been developed with a view to ameliorating at least one of, and in some implementations, different combinations of, the above problems with the prior art.

Broadly speaking, implementations of the present technology are directed to navigation methods and systems, which in response to certain actions display an in-focus POI to the user 102, the in-focus POI being presented in a way that allows the user 102 to clearly see and distinguish the in-focus POI from any other POI that may be simultaneously displayed therewith. In some circumstances, this helps reduce attention span times required from the user 102.

For the purposes of the present technology, a POI is "in-focus" by: (i) being the sole POI displayed, or by (ii) being displayed more prominently in comparison to all other POI(s) simultaneously displayed therewith. In turn, a POI is "out-of-focus" by: (i) not being displayed (i.e. not visible to the user, but "available" along the route or in other words the one that is along the route but out of the viewport of the current view of the user), or (ii) by being displayed less prominently than the "in-focus" POI. A more prominent display of an in-focus POI can be achieved in any suitable way, such as by a distinctive color, by a distinctive object displayed in association therewith, by a distinctive animation of an object representing the POI, by a combination of any of the foregoing, and the like.

In some implementations, the present technology allows the user to refocus a given GUI from the in-focus POI to any other one of a plurality of POIs by allowing the user to "flip through" the POIs, one at a time. In some circumstances, this simplifies operation of a navigation system to which the present technology is applied.

In some implementations, the present technology allows the user to "flip through" the plurality of other POIs, one at a time, via a plurality of POI cards presented via a given GUI. A given one of the POI cards is in-focus, and the user is able to "flip through" the POI cards one at a time. With each "flip through", the in-focus POI card is made an out-of-focus POI card and a sequentially next one of the POI cards is made the in-focus POI card.

For the purposes of the present technology, a POI card is "in-focus" by: (i) being the sole POI card displayed, (ii) by being the sole POI card that is displayed in its entirety, with one or more other POI cards being displayed simultaneously therewith only in part, or by (iii) being displayed more prominently in comparison to all other POI card(s) simultaneously displayed therewith. In turn, a POI card is "out-of-focus" by: (i) not being displayed, (ii) being displayed only in part, or (iii) by being displayed less prominently than the "in-focus" POI card.

In some implementations, the user "swipes" over a given one of the POI cards to "flip through" to a next POI card and this initiates a corresponding coordinated focal response in a map view. The corresponding coordinated focal response makes a previously in-focus POI an out-of-focus POI, and makes a POI associated with the next POI card the new in-focus POI. In some circumstances, the foregoing simplifies operation of the navigation system to which the present technology is applied. In some circumstances, the coordinated focal responses help reduce attention the user's attention time span required for the user to operate a navigation system.

In some implementations of the present technology, the navigation methods and systems allow a user to sequentially "flip through" back and forth between sequential ones of the POI cards and to thereby initiate corresponding coordinated focal responses in the map view via any one of a plurality of simple types of user interactions, such as a finger swipe, a finger tap, an incremental turn of a scrolling wheel of a car, a voice command, and the like.

For example, in some implementations, the user taps over a given one of the POI cards with a single tap of a finger to "flip through" to a sequentially next POI card and to thereby initiate a corresponding coordinated focal response in the map to the POI represented by that next POI card. In some implementations, the user taps over a given one of the POI cards with a double tap of a finger to "flip through" to a sequentially previous POI card and to thereby initiate a corresponding coordinated focal response in the map to the POI associated with that previous POI card.

As another example, in some implementations, the user taps over a voice-commands button and pronounces a voice command requesting a "flip through" to either a combination of a next POI and a corresponding POI card, or a combination of a previous POI and a corresponding POI card. This initiates a corresponding coordinated focal response from the navigation system without the navigation system requiring any additional further action by the user.

In some implementations, a combination of the easy "flip through" capability and the coordinated focal responses helps reduce the user's attention time span required for the user to look over the POI pins shown on the map while operating the navigation application. In some implementations, the combination removes the need for the user to first look over the POI pins on the map and to tap over one or more of the POI pins in order to bring up additional information about the one or more of the POI pins. In other words, with some implementations of the present technology, a user does not need to necessarily tap over a given POI pin in order to bring up additional information about the POI represented by that POI pin.

Moreover, in some circumstances, a combination of the easy "flip through" capability and the coordinated focal responses removes the need for a user to repeatedly tap over different ones of the POI pins on a map in searching for a POI of interest. Additionally, implementations in which the interactive menu portion of the GUI is positioned below the map view or separate from the touchscreen for example, help to reduce the number of required interactions with the map view portion of the touchscreen.

As will become evident from the detailed description that follows herein below, some implementations of the present technology reduce the number of required user interactions with the map view portion of the touchscreen to zero.

Additionally, some implementations of the present technology reduce the number of, and/or the number of types of, user interactions required to operate the navigation applications and/or systems in at least some circumstances.

In yet further aspects, some implementations of the present technology help make selected ones of the POIs easier and/or quicker for a user to focus on in at least some circumstances.

In yet further aspects, some implementations of the present technology help users more quickly determine whether selected POIs are feasible to drive to, irrespective of whether or not the corresponding POI pins appear to be physically close to the user's position.

In yet further aspects, some implementations of the present technology help reduce lengths of attention time spans required to operate navigation applications and/or systems.

In view of the above, and in accordance with a first broad aspect of the present technology, there is provided a method of receiving a user-command by a processor of an electronic device via a touchscreen of the electronic device, the method executable by the processor, the method comprising: displaying, by the processor on the touchscreen, a GUI, the GUI including a map view and an interactive menu displayed in association with the map view, the map view having displayed thereon: a map of a geographical area, and a route along at least a portion of the geographical area, the route having at least two POIs sequentially located along the route, a first POI of the at least two POIs being an in-focus one that is displayed on the map view, and a second POI of the at least two POIs being an out-of-focus one; the interactive menu having displayed thereon: a first POI card associated with the first POI, the first POI card being changeable with a second POI card, the second POI card being associated with the second POI; and in response to receiving an indication of a user interaction with the interactive menu, changing of focus: (i) from the first POI card to the second POI card, and (ii) from the first POI to the second POI.

In some implementations of the method, both the first POI and the second POI are displayed on the map view.

In some implementations of the method, the first POI is being in-focus by being more prominently highlighted compared to the second POI.

In some implementations of the method, the interactive menu has displayed thereon both the first POI card and at least a part of the second POI card.

In some implementations of the method, the first POI card and the second POI card are part of a scrollable row of POI cards, and the indication of the user interaction comprises an indication of the user executing a scrolling action to change the first POI card to the second POI card.

In some implementations of the method, the scrollable row of POI cards is horizontal.

In some implementations of the method, the user interaction is a first type of user interaction; and the method further comprises, after the changing of focus from the first POI to the second POI, in response to receiving an indication of a second type of user interaction with the interactive menu, changing focus from the second POI back to the first POI.

In some implementations of the method, the first type of user interaction is a finger swipe on the touchscreen in one of a left direction and a right direction; and the second type of user interaction is a finger swipe on the touchscreen in the other one of the left direction and the right direction.

In some implementations of the method, the changing of focus from the first POI to the second POI includes moving the map in the map view toward the second POI.

In some implementations of the method, the moving the map in the map view toward the second POI is synchronized with the finger swipe that is the first type of user interaction.

In some implementations of the method, the GUI includes a detour button; the map view has displayed thereon a detour from the route to the first POI; and the method further comprises, in response to receiving an indication of a user interaction with the detour button while the first POI is the in-focus one, effecting a modification to the route to include the first POI in the route.

In some implementations of the method, the GUI includes a cancel button; and the method further comprises, in response to receiving an indication of a user interaction with the cancel button, undoing the modification to the route.

In some implementations of the method, the route extends in a first orientation in the map view; and the first POI card is positioned in a scrollable row that is scrollable in a second orientation, the second orientation being transverse relative to the first orientation.

In some implementations of the method, the first POI card overlaps a part of the map view in the GUI.

In some implementations of the method, the first POI card is at least in part transparent such that the part of the map view is visible through the first POI card.

In some implementations of the method, the method further comprises displaying a position of the user along the route; the first POI being a closest POI relative to the position of the user; and the second POI being a next-closest POI relative to the position of the user.

In some implementations of the method, the method further comprises determining the closest POI and the next-closest POI based on at least one of: distance and a driving time.

In some implementations of the method, the changing of focus: (i) from the first POI card to the second POI card, and (ii) from the first POI to the second POI is executed simultaneously.

In some implementations of the method, the changing of focus: (i) from the first POI card to the second POI card, and (ii) from the first POI to the second POI is executed in a synchronized manner.

In some implementations of the method, the method further comprises displaying, by the processor on the touchscreen in the GUI a voice-commands button; and receiving an indication of a user interaction with the voice-commands button and sequentially thereafter an indication of a voice command requesting navigation to a given POI; and wherein the displaying the route is in response to the receiving the indication of the voice command, the route ending at the given POI.

In some implementations of the method, the method further comprises in response to the receiving the indication of the voice command and prior to the displaying the route, displaying, by the processor on the touchscreen in the GUI a confirmation button; and wherein the displaying the route is in response to receiving, by the processor, an indication of a user interaction with the confirmation button sequentially after the receiving the indication of the voice command.

In accordance with a first broad aspect of the present technology, there is provided an electronic device comprising: a processor, a memory accessible by the processor, and a network module accessible by the processor, the memory storing computer executable instructions, which instructions when executed cause: displaying, by the processor on the touchscreen, a GUI, the GUI including a map view and an interactive menu displayed in association with the map view, the map view having displayed thereon: a map of a geographical area, and a route along at least a portion of the geographical area, the route having at least two POIs sequentially located along the route, a first POI of the at least two POIs being an in-focus one that is displayed on the map view, and a second POI of the at least two POIs being an out-of-focus one; the interactive menu having displayed thereon: a first POI card associated with the first POI, the first POI card being changeable with a second POI card, the second POI card being associated with the second POI; and in response to receiving an indication of a user interaction with the interactive menu, changing of focus: (i) from the first POI card to the second POI card, and (ii) from the first POI to the second POI.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smartphones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not necessarily for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
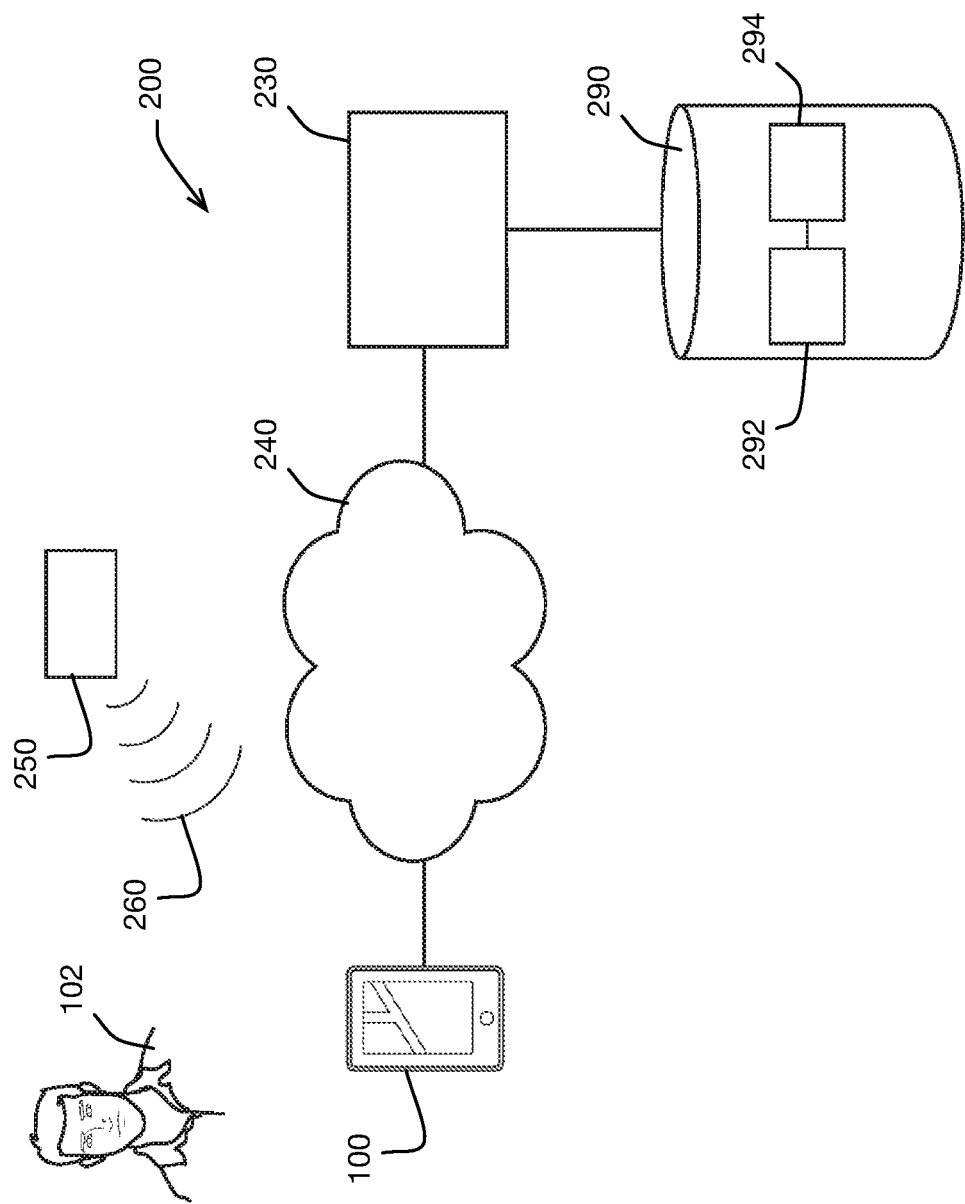
FIG. 1 depicts a schematic diagram of a system suitable for implementing non-limiting implementations of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is shown a non-limiting example of networked computing environment 200 (or simply a "system 200"). The system 200 comprises an electronic device 100 to be used by a user 102. The electronic device 100 and the system 200 are suitable for implementing at least non-limiting implementations of the present technology. In the depicted implementation, the electronic device 100 is implemented as a tablet computer. However, in alternative implementations of the present technology, the electronic device 100 can be implemented as a personal computer (desktops, laptops, netbooks, etc.), a smart phone, a tablet, a portable navigation device, a built-in navigation device, and the like. In this non-limiting implementation, the system 200 comprises the electronic device 100.

The system 200 further comprises a map server 230 in communication with the electronic device 100 via a communications network 240 (e.g. the Internet or the like, as will be described in greater detail herein below), and a GPS satellite 250 transmitting a GPS signal 260 to the electronic device 100. It will be understood that the present technology is not limited to GPS and may employ a positioning technology other than GPS.

In some non-limiting implementations of the present technology, the communications network 240 is the Internet. In alternative non-limiting implementations, the communications network 240 can be implemented as any suitable local area network (LAN), wide area network (WAN), a private communication network or the like. It should be expressly understood that implementations for the communication network are for illustration purposes only. How a communication link (not separately numbered) between the electronic device 100 and the communications network 240 is implemented will depend inter alia on how the electronic device 100 is implemented.

Merely as an example and not as a limitation, in those implementations of the present technology where the electronic device 100 is implemented as a wireless communication device such as a smart phone or a navigation device, the communication link can be implemented as a wireless communication link. Examples of wireless communication links include, but are not limited to, a 3G communication network link, a 4G communication network link, and the like. The communications network 240 may also use a wireless connection with the map server 230.

In some non-limiting implementations of the present technology, the map server 230 is implemented as a conventional computer server. In one non-limiting example, the map server 230 is implemented as a Dell™ PowerEdge™ Server running the Microsoft™ Windows Server™ operating system, but can also be implemented in any other suitable hardware, software, and/or firmware, or a combination thereof. In the depicted non-limiting implementations of the present technology, the server is a single server. In alternative non-limiting implementations of the present technology (not shown), the functionality of the map server 230 may be distributed and may be implemented via multiple servers.

In some non-limiting implementations of the present technology, the map server 230 comprises hardware and/or software and/or firmware, or a combination thereof, for computing and transmitting at least geographic map data and POI-related information to the electronic device 100. To that end, in accordance with the non-limiting implementations of the present technology, the map server 230 is in communication with a database 290, which stores therein POI information 292 and POI card information 294. The POI information 292 includes location information (such as GPS coordinates for example) about each of a plurality of POIs located in a given geographical area.

The POI card information 294 includes additional information about each POI of the plurality of POIs, such as ratings information, website information, contact information, and the like. The POI card information 294 is linked to the POI information 292 such that information about each given POI is associated with a given one of the POI cards. Even though the POI information 292 and the POI card information 294 are depicted as two separate records, these can be stored in a single record. It should be also noted that even though FIG. 1 depicts a single instance of each of the POI information 292 and the POI card information 294, there will be a plurality of each of the POI information 292 and the POI card information 294 stored, one for each POI potentially displayable within the system 200.

It is noted that POI information 292 and the POI card information 294 are for enabling the electronic device 100 to render one or more POI objects associated with one or more of the POIs over a map displayable by the electronic device 100, as described in more detail herein below.

In some non-limiting implementations of the present technology, map data for rendering a map (such as streets, intersections, buildings, parks, etc.) is already stored locally at the electronic device 100. In alternative implementations of the present technology, the map data is transmitted from the map server 230 to the electronic device 100. It is contemplated that the map data can be distributed and can be, for example, in part stored on the electronic device 100 and in part stored on the map server 230. It is also contemplated that the POI information 292 and the POI card information 294 could each be stored at least in part, and in some implementations in their entirety, on the electronic device 100.

In the present non-limiting implementation, the map server 230 further comprises hardware and/or software and/or firmware, or a combination thereof, for executing a machine learning algorithm (MLA) for executing geo-searches and for the providing corresponding subsets of the POI information 292 and the POI card information 294, as may be requested by one or more electronic devices such as the electronic device 100. How the map server 230 trains and executes the machine learning algorithm can be implemented as is known to those of skill in the art. It will be appreciated that an MLA is merely an example of a geo-search, POI selection, and POI ranking algorithm.

It is contemplated that the map server 230 could execute any other suitable algorithm(s), which need not be MLA(s), for executing geo-searches and for providing the POI information 292 and the POI card information 294 to the electronic device 100. It is accordingly contemplated that the map server 230 could comprise any other suitable combination of hardware and/or software and/or firmware for executing the other algorithm(s).

Figure 2:
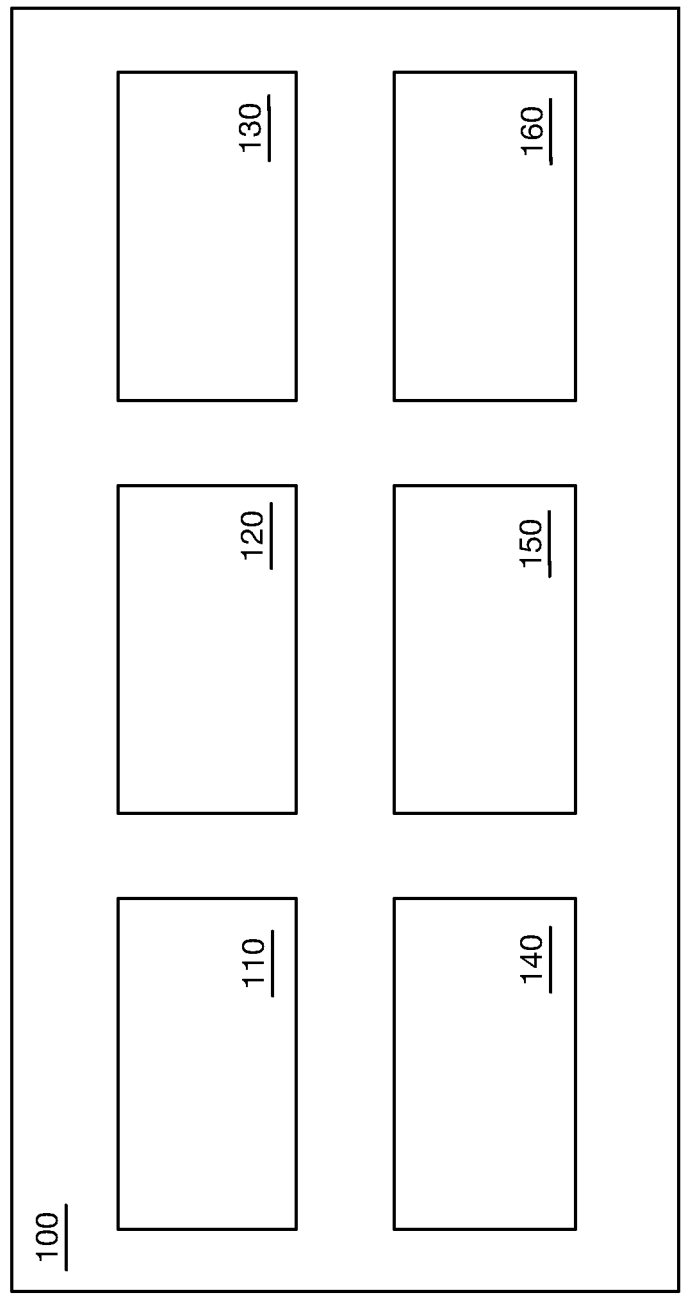
FIG. 2 depicts a schematic diagram of an electronic device of the system FIG. 1.

With reference to FIG. 2, the electronic device 100 comprises various hardware components including one or more single or multi-core processors collectively represented by a processor 110, a solid-state drive 120, a memory 130, which may be a random-access memory, a network module 140, a GPS module 150, and a touchscreen 160. Communication between the various components of the electronic device 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

According to some non-limiting implementations of the present technology, the solid-state drive 120 stores program instructions suitable for being loaded into the memory 130 and executed by the processor 110 for displaying information to a user of the electronic device 100 as will be described in further detail below. In the present non-limiting implementation, the program instructions include a map application 270 (shown in FIGS. 3 to 7) executable by the processor 110. The program instructions may further include other applications for enabling other features of the electronic device 100, such as voice-recognition in some implementations.

The network module 140 allows the communication between the electronic device 100 and the map server 230 via the communications network 240. The GPS module 150 allows the electronic device 100 to receive the GPS signal 260 from the GPS satellite 250 (i.e., for enabling GPS capabilities of the electronic device 100, including determining a current position of the electronic device 100).

Figure 3:
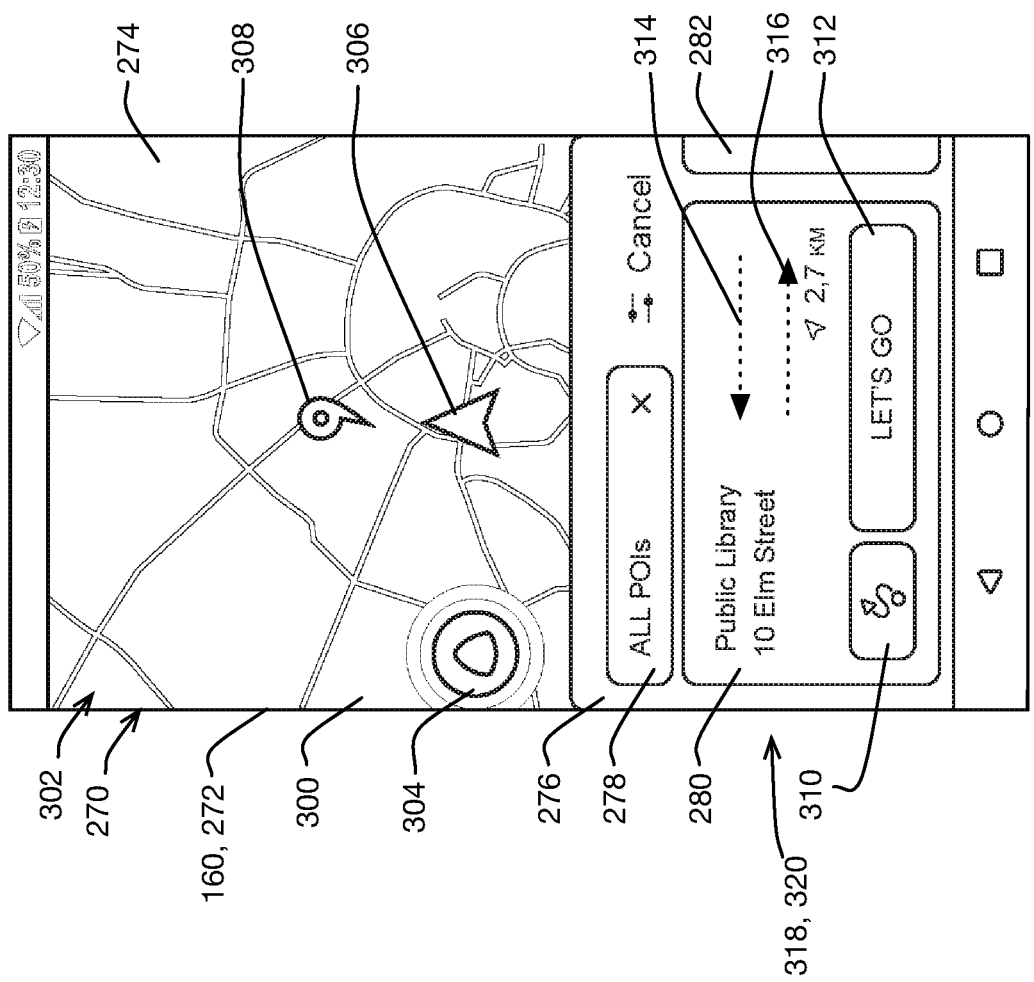
FIG. 3 depicts a screen shot of a GUI displayed on a touchscreen of the electronic device of FIG. 1, the GUI being an output of a map application of the electronic device, the screen shot depicting a particular state of the GUI.

With reference to FIG. 3, the electronic device 100 is configured to execute by the processor 110 the map application 270. The map application 270 is configured to generate a GUI 272 on the touchscreen 160 and to communicate with the map server 230 to: (i) receive map information to be displayed via the GUI 272 (the map information for rendering a map 300 of a geographical area 302 including rendered indications of roads, streets, buildings, lakes, parks, etc.); (ii) receive subsets of the POI information 292 and the POI card information 294 that are relevant to each given geo-search; and (iii) to overlay POI objects over the map 300 displayed on the touchscreen 160 of the electronic device 100.

It is noted that while in the non-limiting implementations described herein, the map application 270 is stored on the solid-state drive 120 and is executed by the processor 110 of the electronic device 100, in other implementations, different hardware and storage configurations could be used. For example, it is contemplated that in some implementations, the map application 270 could be at least in part stored on the map server 230 and/or at least in part executed by one or more processors of the map server 230.

Still referring to FIG. 3, the GUI 272 includes a map view 274 and an interactive menu 276 displayed in association with the map view 274, below the map view 274 with no overlap therewith. In this non-limiting implementation, the map view 274 has displayed thereon: the map 300 of the geographical area 302, and a voice-commands button 304 for activating voice-recognition functions of the electronic device 100 which inter alia allow the processor 110 to receive commands such as geo-search requests of a user 102.

The voice-recognition functions of the electronic device 100 are implemented using conventional voice-recognition technology. It is contemplated that voice-recognition functions could be omitted in some implementations, in which cases a physical and/or a virtual keyboard could be used, for example, to input data and geo-search information into the electronic device 100.

In the present non-limiting implementation, the interactive menu 276 of the GUI 272 has displayed thereon: a POI filter field 278 which displays one or more POI filters which may be selected by the user 102 with regard to a given route, a first POI card 280, and part of a second POI card 282.

The interactive menu 276 further comprises a plurality of additional buttons, such as a settings button and a cancel button (not separately labeled) for allowing the user 102 to configure and interact with the map application 270, and other buttons (not separately labeled) for navigating between different applications that could be executed by the electronic device 100.

In the present non-limiting implementation, the additional buttons are conventional buttons which could be implemented using conventional technology and will not be described in any further detail. It is contemplated that the additional buttons could be provided in any other number and type thereof, and that in some implementations they could be omitted, depending on the particular implementation of the electronic device 100 for example.

In the present non-limiting implementation, when the map application 270 detects a tap of the voice-commands button 304, it activates a microphone (not shown) of the electronic device 100 and thereby allows the electronic device 100 to receive commands from the user 102. This inter alia enables the user 102 to request the map application 270 to carry out a geo-search to find one or more POIs.

In the example shown in FIG. 3, the user 102 has initiated an initial geo-search by requesting the map application 270, via voice after tapping the voice-commands button 304, to locate public libraries in proximity to the user's current location and to display additional POIs of all types (i.e. "ALL POIs", as shown in the POI filter field 278) in association with a route that the user 102 use to navigate to a selected one of the public libraries.

It will be appreciated that the user 102 could have initiated the initial geo-search by simply having called up a virtual keyboard (not shown) by, for example, double tapping on over the map view 274, and then having typed in an appropriate query (e.g. "Public libraries near me"). To this end, it is contemplated that the map application 270 could be configured in any other way for bringing up the virtual keyboard. It is also contemplated that the electronic device 100 could include and/or could be in communication with a physical keyboard. Such keyboard(s) could be implemented using any suitable known technology. In yet additional embodiments of the present technology, the user may have typed in a destination address and/or used voice commands to enter the destination addresses into the map application 270.

Evidently, the public libraries are merely a non-limiting example of a geo-search that could be performed by the user 102, used for the sake of illustration of the present technology. The user 102 can perform any other geo-search to find any other one or more POIs, including a single particular address for example, and can apply any other POI filter or skip applying a POI filter. The POI filter could be selectable in any suitable way.

In the present non-limiting example, in response to the user's geo-search, the map application 270 has requested and received from the map server 230 a plurality of search results (i.e. public libraries in this example) within a certain distance of the user's current location. More particularly, in response to receiving the geo-search request from the map application 270, the map server 230 has generated a set of ranked search results that are responsive to the geo-search request, and has sent the search results to the electronic device 100.

In this implementation of the present technology, the search and transfer of results can be executed one time with respect to each given geo-search, with the results then being stored in the memory 130 and/or the solid-state drive 120 of the electronic device 100 for a given time period during which they are available for use by the map application 270. It is contemplated that any other suitable search request, results retrieval, and/or storage method could be used.

In the present non-limiting implementation, the MLA of the map server 230 generates the set of ranked search results that contains a number of POIs, each POI being responsive to the geo-search request. In the above mentioned example of the geo-search request being "Public libraries near me", each POI in the set of ranked search results is associated with a public library that is located within a pre-determined geographical range from the current location of the user 102, an indication of which was transmitted by the map application 270 to the map server 230 as part of the search results.

In this non-limiting implementation, the map server 230 has ranked the search results from a closest one of the search results to a furthest one of the search results, based on a driving time from the user's current location to each of the search results. It is contemplated that in other implementations, the map server 230 could rank a set of search results based on different criterion or criteria, such as for example based on distances to each of the search results. The present is an example of a routine and method that could be used by the map application 270 and the map server 230 to provide search results responsive to a geo-search request of the user 102. It is contemplated that any other combination of a routine and/or a method could be used.

Still referring to FIG. 3, in this non-limiting implementation, the user's current location is represented with an arrow 306 on the map 300 displayed on the touchscreen 160. Understandably, the user's current location could be represented using any other object.

At the point in time depicted in FIG. 3, the map application 270 has presented to the user 102 a first one of the search results (i.e. "Public Library") which is one of the search results with an associated location (i.e. "10 Elm Street") that is closest to the user's current location in terms of a driving time from the user's current location to that one of the search results. The map application 270 has done so by displaying a POI pin 308 (an example of a POI object) on the map 300 in association with this search result.

The map application 270 has associated the first POI card 280 with the first search result and has accordingly displayed the first search result's name and address ("Public Library" at "10 Elm Street") in the first POI card 280, while displaying only part of the second POI card 282 to the right of the first POI card 280.

The map application 270 has displayed in the first POI card 280 a driving distance via a suggested route to the location associated with this search result (2.7 km in this example), a route snapshot button 310 allowing the user 102 to see a snapshot of and select out of a plurality of possible routes to this location, and a confirmation button 312 (in the example implementation labeled as a "LET'S GO" button) allowing the user 102 to start navigation to the location of that search result via a selected one of the routes. In this implementation, the route selection to a particular POI is enabled using conventional technology.

The map application 270 has further associated a next-closest (in terms of driving time) one of the search results with the second POI card 282, and has configured the second POI card 282 similarly to the first POI card 280. That is, the map application 270 has configured the second POI card 282 to display therein the same type of information and buttons with regard to the next-closest one of the search results as are displayed in the first POI card 280 with regard to the closest-one of the search results.

The map application 270 has further similarly assigned and configured an additional POI card (not shown) for each one of remaining search results (not shown), thereby creating a first set of POI cards 318 which is associated with the first set of search results of the initial geo-search. Understandably, in this non-limiting implementation the POI information 292 and POI card information 294 for each of the search results were located and retrieved by the map server 230 from the database 290 and sent to the electronic device 100 via the communications network 240 as part of the search results.

As shown in FIG. 3, in this non-limiting implementation, the map application 270 is configured to display the POI cards in this first set of POI cards 318 one at a time, along with a part of a sequentially next one of the POI cards, in the interactive menu 276, in a horizontal, scrollable row 320 of the first set of POI cards 318.

At the point in time depicted in FIG. 3, the first POI card 280 is displayed in its entirety, the second POI card 282 is displayed only in part, and the remaining POI cards associated with the search results are not displayed. Accordingly, at this point in time, the first POI card 280 is in-focus because it is the only POI card displayed in its entirety, the second POI card 282 is out-of-focus because it is displayed only in part, and the rest of the first set of POI cards 318 are out-of-focus because they are not displayed. Similarly, at this point in time, the displayed search result is in-focus by being the only displayed search result, and the next-closest one of the search results is out-of-focus because it is not displayed.

In this non-limiting implementation, the scrollable row 320 of the first set of POI cards 318 is configured to be scrollable in a horizontal direction indicated by arrow 314. To this end, the map application 270 is configured to receive an indication of a user interaction with the interactive menu 276 and in response to sequentially "flip through" the first set of POI cards 318 by scrolling the first set of POI cards 318 in a leftward horizontal direction, one at a time, and to correspondingly "flip through" each of the search results, respectively, one at a time.

These coordinated actions provide for sequential presentation, for each of the search results, of a combination of: (i) an associated POI pin, the POI pin being displayed in a corresponding location on the map 300, and (ii) an associated POI card presented in the interactive menu 276.

In this non-limiting implementation, the user interaction is a leftward finger swipe of a finger of the user 102 over the interactive menu 276, as shown with arrow 314. In response to each such leftward finger swipe, the map application 270: (i) hides, and therefore makes out of focus, a POI pin associated with a displayed one of the search results from the map 300 and instead displays a new POI pin on the map 300 associated with a next-closest one of the search results, thereby making the next-closest search result the new in-focus POI; and (ii) scrolls the POI card associated with the displayed one of the search results horizontally leftward out of view, thereby making that POI card out-of-focus. The scrolling replaces the POI card with a next POI card which is associated with the next-closest one of the search results, and thereby makes that next POI card in-focus.

To give an example, when at the point in time depicted in FIG. 3 the user 102 performs a leftward finger swipe as shown with arrow 314, in response the map application 270 hides the POI pin 308 associated with the "Public Library" (a first POI) at "10 Elm Street" and scrolls the first POI card 280 horizontally leftward out of view. The map application then displays a new POI pin (not shown) associated with the next-closest one of the public libraries (not shown) on the map 300 and scrolls the second POI card 282 into the place of the first POI card 280.

In the present non-limiting implementation, the disappearance of the POI pin 308 and the appearance of the new POI pin is synchronous with the finger swipe. That is to say, the progression of the disappearance of the POI pin 308 and the appearance of the new POI pin is animated proportionally to the scrolling movement of the POI cards, and the scrolling movement of the POI cards is animated proportionally to the movement of the finger executing the finger swipe.

In some implementations, the changing of a first POI card for a sequentially next POI card is completed first, with the replacement of the corresponding POI pins being executed only thereafter. In some implementations, there is no animation and changes of focus happen "instantaneously".

In this non-limiting implementation, the map application 270 in response to additional leftward finger swipes, analogously sequentially "flips through" the remaining POI cards while providing corresponding coordinated focal responses in the search results (POIs) as described above. By repeatedly swiping in the same direction, the user 102 can "flip through" each of the remaining search results and come back to the first search result after the last search result (i.e. the search results are "looped").

Also in this non-limiting implementation, the leftward finger swipe is a first type of user interaction and the map application 270 is configured to receive an indication of a second type user interaction with the interactive menu 276. In this implementation, the second type user interaction is a rightward finger swipe as shown with arrow 316. In response to the second type user interaction, the map application 270 "flips through" the search results in reverse. For example, from a third-closest one of the search results to a second-closest one of the search results, then from the second-closest one of the search results to the closest one of the search results, then from the closest one of the search results to the furthest one of the search results, and so on.

Understandably, these changes of focus are accompanied by corresponding coordinated changes of POI cards, but in a reverse direction. It is contemplated that in some implementations, the mapping of the first type user interaction and the second type user interaction to the directions of the "flip throughs" could be reversed.

In a further aspect of the present non-limiting implementation, and as shown in FIG. 3, for the initial geo-search performed by the user 102, the map application 270 is configured to present the map 300 at a zoom level showing a portion of the map 300 in the map view 274 such that all of the locations of the search results can be displayed on that portion of the map 300 without moving the map 300 or changing the zoom level.

This allows the map application 270 to "flip through" the search results of the initial geo-search and to sequentially present a corresponding POI pin on the map 300 for each of the search results as described herein above, without changing the zoom level or moving the map 300 in the map view 274.

In other implementations, different zooming configurations could be used. For example, in some implementations, the map application 270 is configured to display the map 300 relatively more zoomed in after an initial geo-search and to move the map 300 toward the location associated with each newly selected search result.

At the point in time shown in FIG. 3, once a desired one of the search results of the initial geo-search, and a desired one of the possible routes (using any suitable route selection methods) to that one of the search results, are selected by the user 102, the map application 270 can receive an indication of a tap of a finger of the user 102 (another example of a user interaction) over the confirmation button 312 associated with the selected search result.

Figure 4:
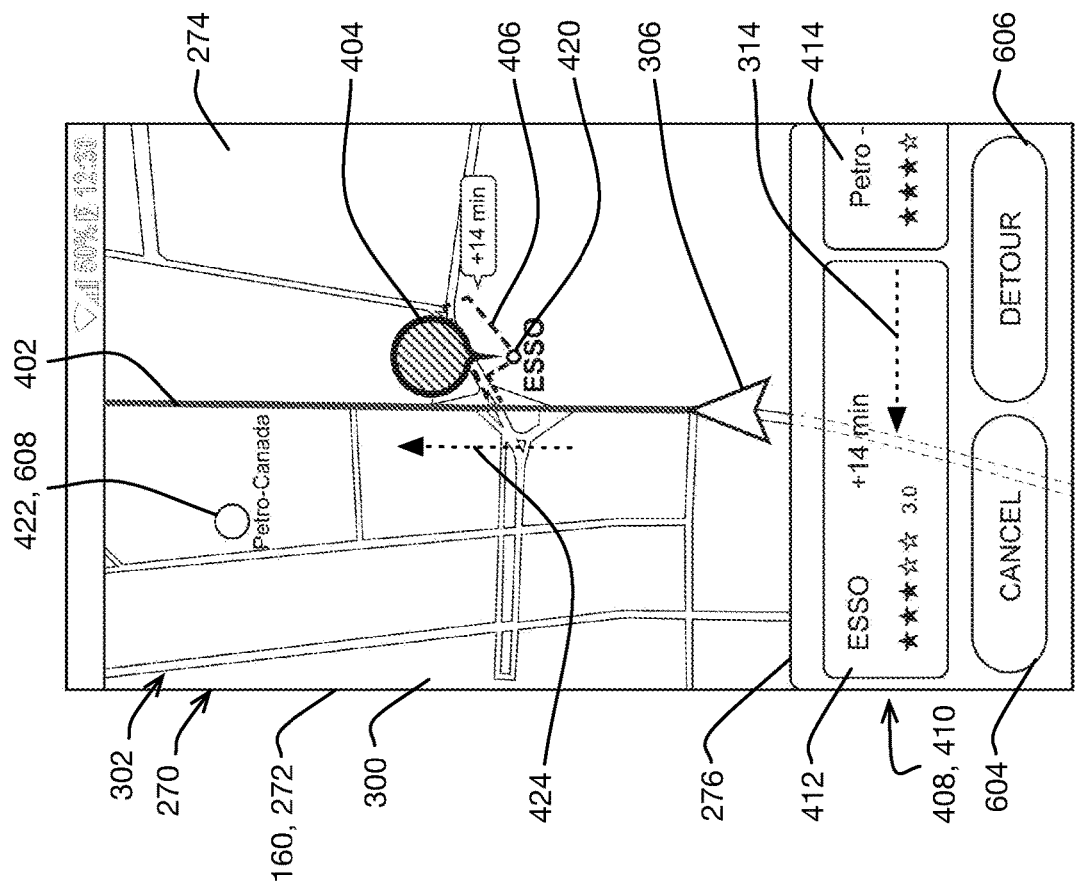
FIG. 4 depicts another screen shot of the GUI of FIG. 1, the screen shot depicting another particular state of the GUI.

In response, and as shown in FIG. 4, the map application 270 generates the route 402 selected for the selected search result and zooms the map 300 over the user's current location, showing the user's current location with the arrow 306 at a bottom portion of the map view 274. As shown, in this non-limiting implementation the route 402 is oriented in a vertical orientation 424 and the new set of POI cards 410 is presented in a row 408 oriented in a horizontal direction indicated by arrow 314.

In this non-limiting implementation, in accordance with the user's POI filter selection of "All Possible POIs", the map application 270 had, as part of its initial geo-search request to the map server 230, requested and received from the map server 230 a plurality of all POIs associated with the route 402 and a new set of POI cards 410 corresponding to those POIs.

In the resulting GUI 272 shown in FIG. 4, a given POI is made in-focus by being the only POI with respect to which a POI pin 404 is displayed, and a given POI card is made in-focus by being the only POI card displayed in its entirety. Conversely, a given POI is made out-of-focus by either not being displayed or by being displayed less prominently than the in-focus POI, and a given POI card is made out-of-focus either by not being displayed or by being displayed only in part.

In the present example, the POIs to be displayed in association with the route 402 include a first POI 420, a second POI 422, and a third POI 502 (FIG. 5), which are an "ESSO" gas station, a "Petro-Canada" gas station, and a "National History Museum", respectively.

At the point in time depicted in FIG. 4, the map application 270 displays the POI pin 404 in association with the "ESSO" gas station (the in-focus POI), displays a relatively less-prominent object (in this example, a non-highlighted circle) in association with the "Petro-Canada" gas station (an out-of-focus POI), and does not display the "National History Museum" (another out-of-focus POI). In the present non-limiting implementation, the map application 270 also bolds the textual label of the in-focus one of the POIs (the "ESSO" gas station at this point in time).

It will be appreciated that the "National History Museum" is not yet visible on the map 300 given the user's current location on the map 300 and the zoom level of the map 300 depicted in FIG. 4, but will become visible later on as the user 102 progresses along the route 402.

Alternatively, in the present non-limiting implementation the map application 270 is configured to allow the user 102 to "shift" the map 300 in the map view 274 in response to receiving of an indication of a user interaction (such as a swipe with two fingers simultaneously) with the map view 274. This could allow the user 102 to manually "shift" the map 300 toward the "National History Museum" to make it visible. It is contemplated that different zooming configurations could be used which could allow the map application 270 to simultaneously display a different number of the POIs along the route 402 and/or to move the map 300 in the map view 274.

Further as shown in FIG. 4, the map application 270 associates a first new POI card 412 with the "ESSO" gas station (the first POI 420), a second new POI card 414 with the "Petro-Canada" gas station (the second POI 422), and a third POI card (not shown) with the "National History Museum" (the third POI 502). Since at the point in time shown in FIG. 4 the "ESSO" gas station is closest to the user's current position in terms of driving time, it is the in-focus POI. Accordingly, the "Petro-Canada" gas station and the "National History Museum" are out-of-focus. Further accordingly, the map application 270 displays the first new POI card 412 ("ESSO" POI card) in its entirety, the second new POI card 414 ("Petro-Canada" POI card) only in part, and does not display the POI card associated with the "National History Museum".

It is contemplated that in alternative implementations, two or more of the POI cards could be simultaneously shown in the interactive menu 276 in their entirety, with one of the POI cards corresponding to the in-focus POI and being shown more prominently than the other POI card(s). It is also contemplated that only one POI card could be shown in the interactive menu 276 at any given time, the POI card corresponding to the in-focus POI.

Coming back to the present non-limiting implementation, the map application 270 is further configured to request and receive from the map server 230, and to display on the map 300, a detour 406 from the route 402 to the in-focus one of the POIs. In this non-limiting implementation, the map application 270 displays the detour 406 solely for each in-focus one of the POIs. Accordingly, at the point in time depicted in FIG. 4, the detour 406 to the "ESSO" gas station is shown. The map application 270 displays the detour 406 in dashed lines, but it is contemplated that any other visual representation could be used. It is contemplated that the map application 270 could display the detour 406 for one or more out-of-focus ones of the POIs simultaneously with the detour 406 to the in-focus one of the POIs.

Yet further in this non-limiting implementation, the map application 270 is configured to request and receive from the map server 230 and to display on the map 300 a detour time (not separately labeled) associated with the detour 406, the detour time being representative of an estimated time that the detour 406 would add to the route 402 if the detour 406 were to be followed by the user 102. Accordingly, in this example, the map application 270 displays a detour time of +14 minutes associated with the detour 406 to the "ESSO" gas station. In this non-limiting implementation, the detour time is displayed both: at a position proximate the POI pin 404, and in the first new POI card 412.

In the present non-limiting implementation, the map application 270 selects the in-focus one of the POIs to be presented in association with the route 402 in one of the following three ways.

First, in cases where the user 102 simply follows the route 402, the map application 270 selects the in-focus one of the POIs based on the time proximity of the POIs to be presented in association with the route 402 to the user's current location. More particularly, the map application 270 compares the locations of the POIs to be presented in association with the route 402, and determines which one of these POIs is closest to the user's current location in terms of driving time. The map application 270 then makes the one of these POIs with the shortest associated driving time as the in-focus one of the POIs.

Second, the map application 270 is configured to detect, and hence the processor 110 is configured to receive, an indication of a user interaction (such as a swipe with two fingers simultaneously) with the touchscreen 160 over the map view 274. In response, the map application 270 is configured to correspondingly "shift" the map 300 in the map view 274 in the direction of the user interaction. In some such implementations, the map application 270 can display a different one of the POIs to be the in-focus one of the POIs based on the different one of the POIs being "shifted" in the map view 274 into a predetermined radius of a predetermined point on the map view 274.

For the sake of an example, the predetermined radius could be two centimeters (or all visible real estate of the view port), measured along the touchscreen 160, and the predetermined point on the map view 274 could be a geometric center of the map view 274. Such manual "shifting" could therefore be used to manually select one of the POIs to be the in-focus one of the POIs. It should be noted that such manual selections are accompanied by corresponding coordinated focal responses of the POI cards as described herein above.

Third, the map application 270 is configured to detect, and hence the processor 110 is configured to receive, an indication of a user interaction with the interactive menu 276 at any time while the user 102 is following the route 402, as was described herein above with regard to the first set of POI cards 318 in the initial geo-search. That is, with regard to the new set of POI cards 410, in response to receiving each such user interaction, the map application 270 changes focus: (i) from the in-focus one of the POIs to a sequentially next-closest one of the POIs, and (ii) from the POI card associated with the in-focus POI to a sequentially next one of the new set of POI cards 410.

For example, from the point in time shown in FIG. 4, when the processor 110 receives an indication of a leftward finger swipe on the touchscreen 160 over the interactive menu 276, as shown with arrow 314, the map application 270 removes the POI pin 404 and the detour 406 from the "ESSO" gas station and instead displays: (i) the POI pin 404 in association with the "Petro-Canada" gas station, and (ii) a new detour 506 (FIG. 5) to the "Petro-Canada" gas station. The resulting view is shown in FIG. 5.

Figure 5:
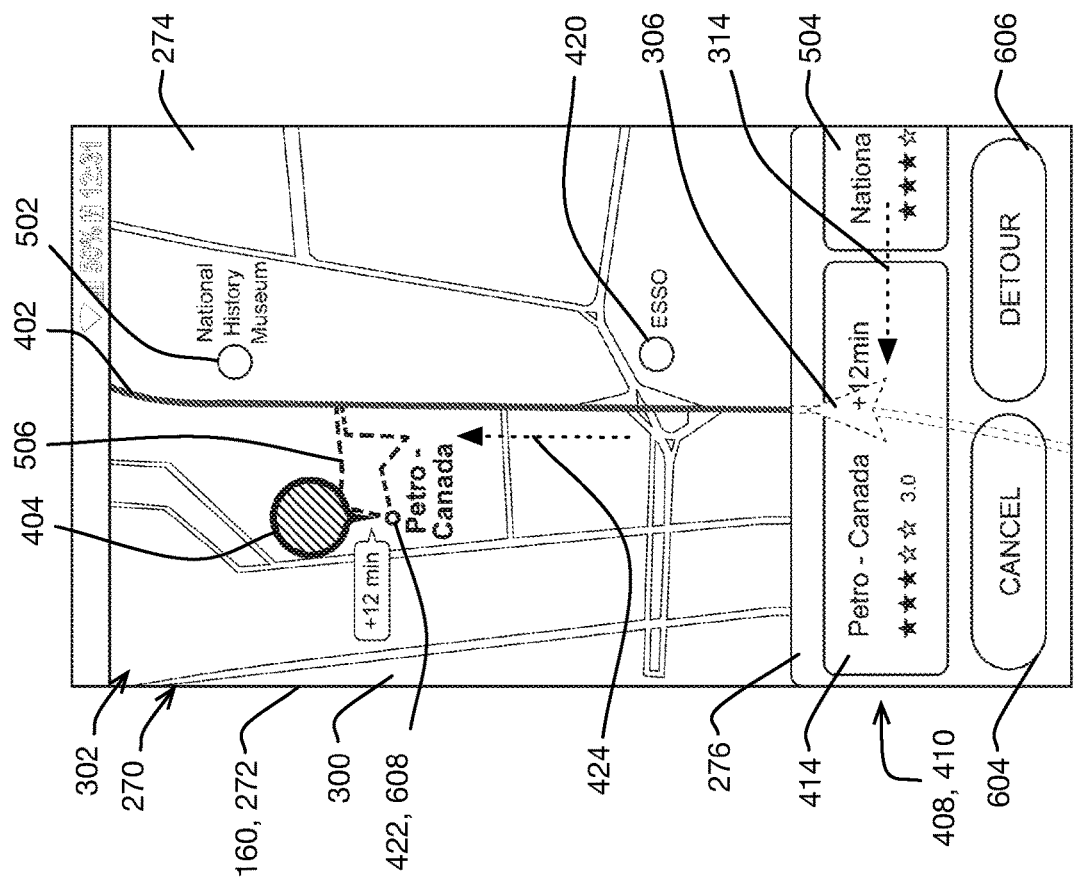
FIG. 5 depicts another screen shot of the GUI of FIG. 1, the screen shot depicting yet another particular state of the GUI.

As shown in FIG. 5, by now displaying the POI pin 404 in association with the "Petro-Canada" gas station while displaying a single, less-prominent, smaller, non-highlighted circle next to each of the other POIs, the map application 270 has made the "Petro-Canada" gas station in-focus, and the "ESSO" gas station and the "National History Museum" out-of-focus.

In the present implementation, the refocusing action has also triggered a movement of the map 300 toward the "Petro-Canada" gas station to position the "Petro-Canada" gas station more centrally in the map view 274 as shown in FIG. 5. It should be noted that, as shown in FIG. 5, this movement of the map 300 has brought the "National History Museum" (the third POI 502) into view.

Further in this example, simultaneously and in a synchronized manner with the movement of the map 300, the map application 270 has changed the first new POI card 412 for the second new POI card 414, by having scrolled the horizontal row 408 of the new set of POI cards 410 leftward until the first new POI card 412 changed with the second new POI card 414.

In this context, the term "simultaneously" means that the scrolling action started at the same time as the movement of the map 300, and the term "synchronized" means that the scrolling action animation was proportionate to the animation of the movement of the map 300 and occurred in the time period that was common to both the movement of the map 300 and the scrolling action. In other words, in the present non-limiting implementation, the movement of the map 300 and the scrolling action have been initiated at one and the same time, and have terminated at one and the same time.

In this non-limiting implementation, the moving of the map 300 in the map view 274 is synchronized with the finger swipe. It is contemplated that the map application 270 could be configured to provide non-synchronized refocusing and/or scrolling actions.

At the point in time depicted in FIG. 5, the map application 270 displays the POI pin 404 in association with the "Petro-Canada" gas station and the new detour 506 for "Petro-Canada" gas station. The map application 270 also displays the detour time (+12 minutes in this example) associated with the new detour 506, both in proximity to the new location of the POI pin 404 and in the second new POI card 414. The second new POI card 414 is accordingly displayed in the interactive menu 276 in place of the first new POI card 412, and a third POI card 504 is displayed to the right of the second POI card 282 in the horizontal row 408 of the new set of POI cards 410. As one will appreciate, the third POI card 504 corresponds to the third POI 502 (the "National History Museum").

From this point in time, the map application 270 continues to monitor for additional indications of user interactions with the interactive menu 276. In response to the processor 110 receiving an additional indication of another leftward finger swipe of a finger of the user 102 over the interactive menu 276, the map application 270, via the processor 110, again changes focus: (i) from the in-focus POI to a sequentially next-closest POI, and (ii) from the POI card associated with the in-focus POI to a sequentially next one of the POI cards.

That is, from the point in time shown in FIG. 5, when the processor 110 receives an indication of an additional leftward finger swipe over the interactive menu 276, as shown with arrow 314, the map application 270 removes the POI pin 404 and the detour 506 from the "Petro-Canada" gas station. Now referring to FIG. 6, the map application 270 in response then shows: (i) the POI pin 404 in association with the "National History Museum", and (ii) a new detour 600 to the "National History Museum". Understandably, at this point the "Petro-Canada" gas station is no longer in-focus and is instead out-of-focus.

Figure 6:
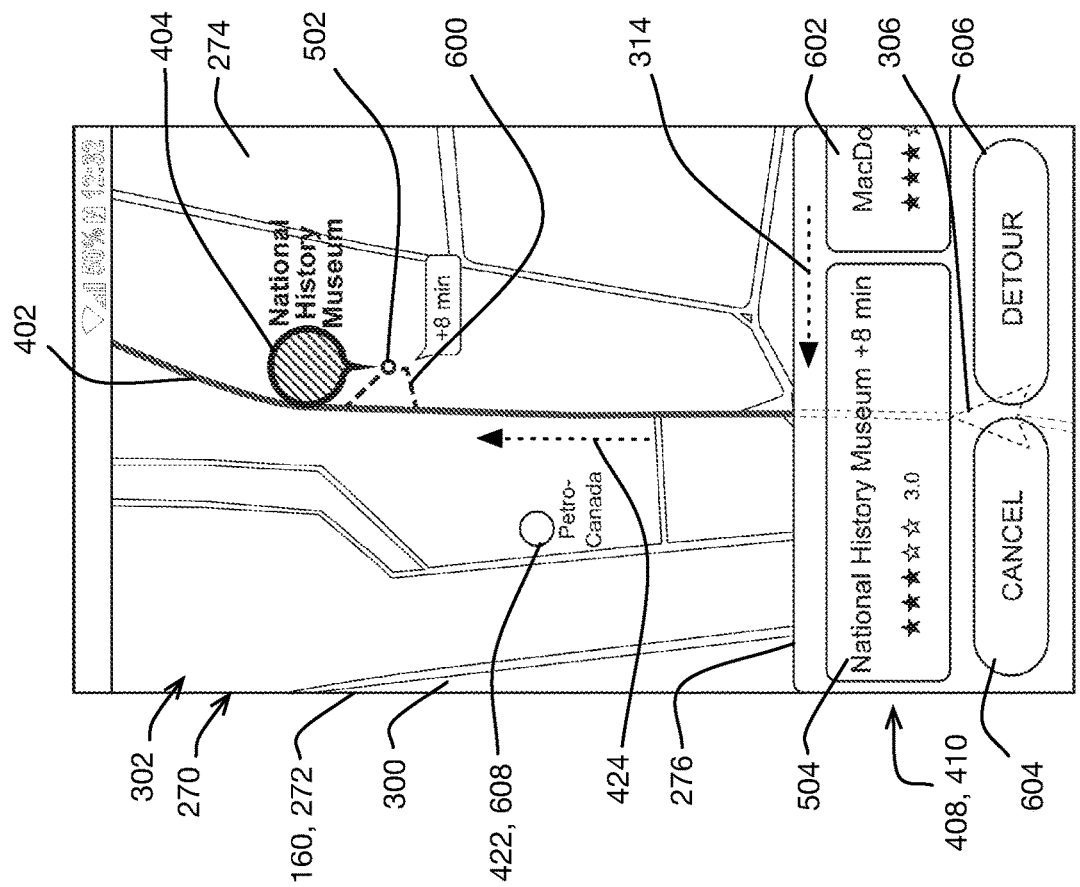
FIG. 6 depicts another screen shot of the GUI of FIG. 1, the screen shot depicting yet another particular state of the GUI.

Along with the refocusing, the map application 270 moves the map 300 toward the "National History Museum" to position it more centrally in the map view 274 as shown in FIG. 6. The map application 270 also changes the second new POI card 414 for the third POI card 504 by scrolling the horizontal row 408 of POI cards 410 leftward until the second new POI card 414 is no longer visible and the third POI card 504 is positioned in place of the second new POI card 414.

The map application 270 thereby changes focus: (i) from the second new POI card 414 to the third POI card 504, and (ii) from the "Petro-Canada" gas station to the "National History Museum". Again, in this non-limiting implementation, the moving of the map 300 in the map view 274 toward the "National History Museum" is synchronized with the corresponding finger swipe that has triggered this refocusing from the "Petro-Canada" gas station to the "National History Museum".

As shown in FIG. 6, the movement of the map 300 toward the "National History Museum" has brought the "ESSO" gas station out of view. At the point in time depicted in FIG. 6, the map application 270 displays the POI pin 404 in association with the "National History Museum" and the detour 600 to the "National History Museum", and no object other than a non-highlighted circle 608 in association with the "Petro-Canada" gas station.

At that point in time, the map application 270 also displays the new detour time (+8 minutes in this example) associated with the detour 600 to the "National History Museum", both in proximity to the new location of the POI pin 404 and in the third POI card 504. The third POI card 504 is accordingly displayed in the interactive menu 276 in place of the second POI card 282, and a fourth (previously non-visible) POI card 602 is displayed to the right of the third POI card 504 in the horizontal row 408 of POI cards 410.

Understandably, the fourth POI card 602 corresponds to a fourth POI (not shown, and being a "MacDonald's" for the sake of this example) to be presented in association with the route 402 as the user 102 progresses along the route 402.

Still referring to FIG. 6, for modifying the route 402 to include a given one of the POIs presented in association therewith and/or cancelling such modifications, the map application 270 displays in the interactive menu 276 a cancel button 604 and a detour button 606. In the present non-limiting implementation, the cancel button 604 and the detour button 606 are arranged in a horizontal row (not separately labeled) and are positioned below the horizontal row 408 of POI cards 410.

When the map application 270 receives an indication of a user interaction with the detour button 606 (in this non-limiting implementation, a tap) while a given POI is in-focus, in response the map application 270 effects a modification to the route 402 to include the given POI in the route 402. At the point in time shown in FIG. 6, the "National History Museum" is in-focus. Therefore, from that point in time when the map application 270 receives an indication of a tap on the touchscreen 160 over the detour button 606, the map application 270 effects a modification to the route 402 to include the "National History Museum" in the route 402.

Figure 7:
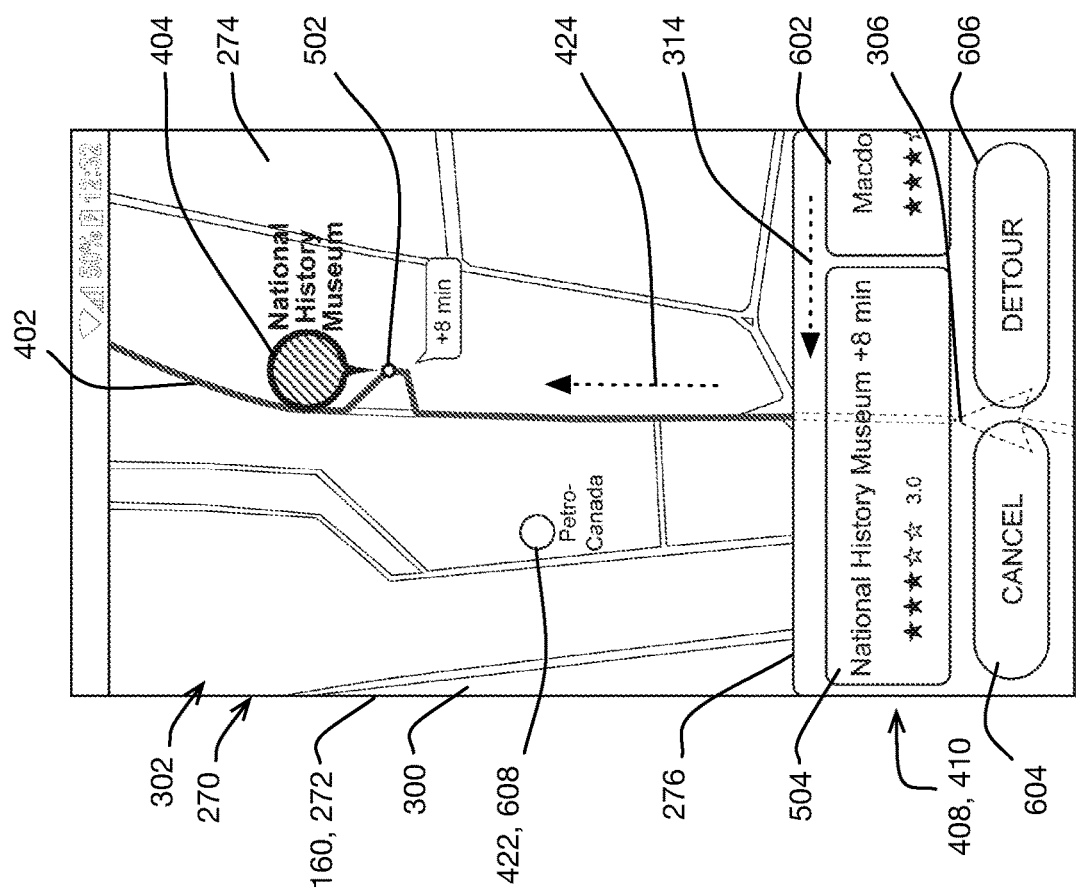
FIG. 7 depicts another screen shot of the GUI of FIG. 1, the screen shot depicting yet another particular state of the GUI.

FIG. 7 shows this modification to the route 402 having been effected. More particularly, at the point in time shown in FIG. 7, the route 402 includes the "National History Museum" therein. The map application 270 accordingly requests a new set of navigation instructions from the map server 230 for the modified route 402. It is contemplated that any other suitable routine and/or method could be used in order to retrieve new sets of navigation instructions corresponding to newly selected, or newly modified, routes.

It should be noted that in the present non-limiting implementation, navigation instructions are provided to the user 102 via an automated voice over a speaker of the electronic device 100 using conventional technology. In other implementations, instructions are displayed on the touchscreen 160. It is contemplated that any known technology could be used to provide navigation instructions to the user 102.

Returning to the present non-limiting implementation, in cases where, after the route 402 has been modified, the map application 270 receives an indication of a user interaction with the cancel button 604 (in this non-limiting implementation, a tap), in response the map application 270 "undoes" the modification to the route 402 to exclude the in-focus POI (in this example, the "National History Museum") therefrom and reverts to the previous set of navigation instructions. That is, in the present example, the route 402 shown in FIG. 7 would be modified back to the route 402 as it is shown in FIG. 6.

Further in the present non-limiting implementation, the map application 270 is configured to cancel navigation along the route 402 altogether, thereby ending navigation to the destination of the route 402, in response to receiving an additional user interaction with the cancel button 604 after the "undo" of the route 402 has been effected. It is contemplated that the map application 270 could be configured to carry out any other suitable combination of functionalities in response to receiving one or more user interactions with the cancel button 604.

It is noted that in the non-limiting implementations of the present technology as described herein above, indications of user interactions are received via the touchscreen 160 of the electronic device 100. However, in other implementations, indications of one or more types of user interactions could be received via a one or more auxiliary input devices.

For example, in implementations where the electronic device 100 is implemented as a navigation system in a vehicle or a vessel, the navigation system may comprise one or a combination of auxiliary input devices such as a joystick, a touchpad, a scroll wheel, and the like, which could be in communication with the electronic device 100 and for example with the processor 110 of the electronic device 100.

In such implementations, the electronic device 100, and more particularly the processor 110, could be configured to receive the various indications of user interactions via the one or more of the auxiliary input devices either in addition to, instead of, or in combination with being configured to receive indications of user interactions via the touchscreen 160 as described herein above.

Figure 8:
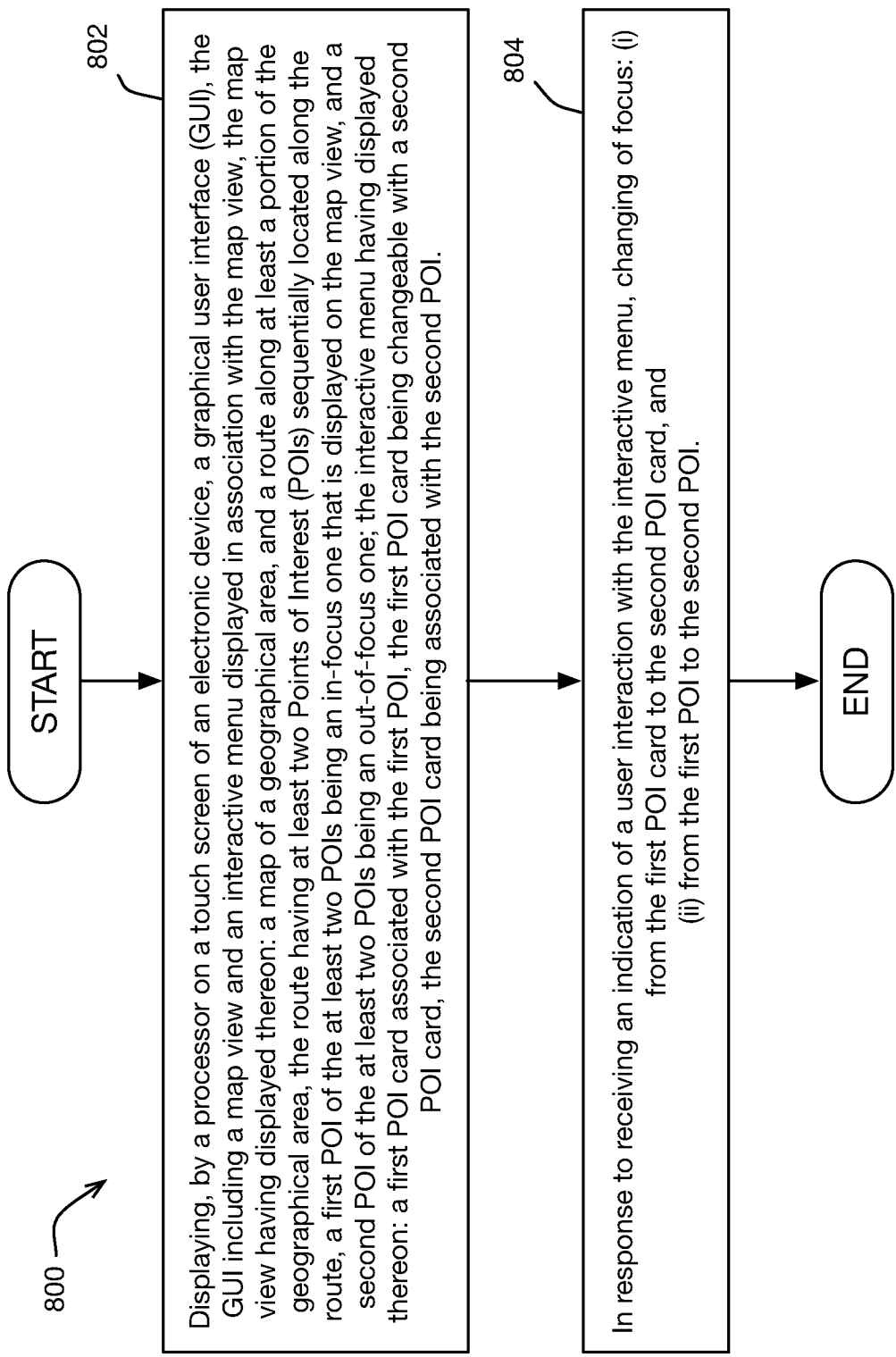
FIG. 8 depicts a block diagram of a non-limiting implementation of a method according to the present technology.

Now referring to FIG. 8, in accordance with the non-limiting example implementations of the present technology, and given the non-limiting implementation of architecture described herein above, it is possible to execute a method 800 of receiving a user-command by the processor 110 of the electronic device 100 via the touchscreen 160 of the electronic device 100. To this end, FIG. 8 depicts a block diagram of an non-limiting implementation of the method 800.

Step 802—Displaying, by the Processor on the Touchscreen, the GUI Including the Map View and the Interactive Menu Displayed in Association with the Map View.

The method 800 begins at step 802, which involves displaying, by the processor 110 on the touchscreen 160, the GUI 272 including the map view 274 and the interactive menu 276 displayed in association with the map view 274. In this non-limiting implementation, the map view 274 has displayed thereon: the map 300 of the geographical area 302, and the route 402 along at least a portion of the geographical area 302.

The route 402 has at least two POIs sequentially located along the route 402. In this example, the at least two POIs include a first POI and a second POI. An example of this arrangement can be seen at the point in time depicted in FIG. 4. At this point in time, the route 402 has the "ESSO" gas station (which in this example is the first POI) and the "Petro-Canada" gas station (which in this example is the second POI) sequentially located along the route 402.

Further in this non-limiting implementation of the method 800, the interactive menu 276 has displayed thereon: a first POI card associated with the first POI, the first POI card being changeable with a second POI card, the second POI card being associated with the second POI.

Continuing with the FIG. 4 example given herein above, in this case the first POI card is the first new POI card 412 which displays the name and other information associated with the "ESSO" gas station. The second POI card is the second new POI card 414 which displays the name and other information associated with the "Petro-Canada" gas station. The first new POI card 412 is changeable with the second new POI card 414 by being scrolled leftward out of view until the second new POI card 414 becomes positioned in place of the first new POI card 412.

Step 804—in Response to Receiving an Indication of a User Interaction with the Interactive Menu, Changing of Focus: (i) from the First POI Card to the Second POI Card, and (ii) from the First POI to the Second POI.

The method 800 continues with step 804, at which in response to receiving an indication of a user interaction with the interactive menu 276, the processor 110 changes focus: (i) from the first POI card to the second POI card, and (ii) from the first POI to the second POI.

Continuing with the FIG. 4 example given herein above, in response to a leftward finger swipe over the interactive menu 276, the processor 110 changes the first new POI card 412 displaying the name "ESSO" for the second new POI card 414 displaying the name "Petro-Canada". The processor 110 also moves the POI pin 404 from the "ESSO" gas station to the "Petro-Canada" gas station. The pre-refocusing state of the GUI 272 is seen in FIG. 4. The refocused state of the GUI 272 is seen in FIG. 5.

In some implementations of the method 800, both the first POI and the second POI are displayed on the map view. An example of this is seen in FIG. 4, in which both the "ESSO" gas station and the "Petro-Canada" gas station are visible in the map view 274.

In some implementations of the method 800, a only single one of the POIs is displayed on the map view at any one time, the single one of the POIs being the in-focus one of the POIs. An example of this arrangement is seen in FIG. 3, in which the map view 274 displays only the "Public Library" at "10 Elm Street" in the map view 274.

In some implementations of the method 800, the first POI is being in-focus by being more prominently highlighted compared to the second POI. For example in FIG. 4, the "ESSO" gas station is highlighted more prominently by the POI pin 404 being displayed in association therewith, in comparison to the "Petro-Canada" gas station which is identified with a single, non-highlighted, circle 608.

It is contemplated that in other implementations, the more prominent highlighting could be achieved differently, such as for example by placing a highlighted rectangle, circle, crosshair, and the like, over the in-focus one of the POIs. Any other more prominent highlighting could also be used, so long as the in-focus one of the POIs stands out from all other visible POIs.

In some implementations of the method 800, the interactive menu 276 has displayed thereon both the first POI card and at least a part of the second POI card. An example of this non-limiting implementation is shown in FIG. 4, where the entirety of the first new POI card 412 corresponding to the "ESSO" gas station is visible together with a part of the second new POI card 414 corresponding to the "Petro-Canada" gas station.

It is contemplated that in other implementations of the method 800, multiple entire POI cards could be simultaneously displayed on the interactive menu 276, one of the multiple entire POI cards being associated with the in-focus one of the POIs and being an in-focus one of the POI cards, while the rest of the multiple entire POI cards are out-of-focus ones of the POI cards.

In such implementations, for the sake of an example, an in-focus POI card could be in-focus by being rendered more prominently than the out-of-focus POI cards, using a distinctive color, a relatively thicker outline, an additional object rendered thereabout, a distinctive animation, and the like.

In a more particular example, the in-focus one of the POI cards could be rendered in a particular color while the rest of the displayed POI cards could be rendered in a different color, the particular color of the in-focus one of the POI cards being selected to stand out relative to the different color(s) of the rest of the multiple entire POI cards.

As yet another more particular example, in some implementations of the method 800, only one entire POI card could be displayed on the interactive menu 276 at any given time, with no part of any of the other POI cards being displayed simultaneously with the one entire POI card. In such implementations, the displayed one of the POI cards would be in-focus by virtue of being the only displayed POI card, and the rest of the POI cards would be out-of-focus by virtue of not being displayed.

In some implementations of the method 800, the first POI card and the second POI card are part of a scrollable row of POI cards, and wherein the indication of the user interaction comprises an indication of the user executing a scrolling action to change the first POI card to the second POI card.

To give examples of this configuration, at the point in time depicted in FIG. 3, the scrollable row would be the scrollable row 320, the first POI card would be the first POI card 280, and the second POI card would be the second POI card 282. At the point in time depicted in FIG. 4, the scrollable row would be the scrollable row 408, the first POI card would be the first new POI card 412, and the second POI card would be the second new POI card 414.

In the present non-limiting implementation, at each point in time depicted in FIGS. 3 to 7, an example of the indication of the user executing a scrolling action would be a leftward finger swipe on the touchscreen 160 over the interactive menu 276. It is contemplated that in some implementations, the indication of the user executing a scrolling action could instead be a rightward finger swipe on the touchscreen 160 over the interactive menu 276.

It is further contemplated that in some implementations, the indication of the user executing a scrolling action could be a different type of user interaction, such as a single tap over the interactive menu 276 to execute a scrolling action in a first direction, or a double tap over the interactive menu 276 to execute a scrolling action in a second direction opposite the first direction.

In some implementations of the method 800, and such as is shown in FIGS. 3 to 7, the scrollable row of POI cards is horizontal. In other implementations of the method 800, the scrollable row of POI cards is vertical.

In some implementations of the method 800, the user interaction is a first type of user interaction; and the method 800 further comprises, after the changing of focus from the first POI to the second POI, in response to receiving an indication of a second type of user interaction with the interactive menu 276, changing focus from the second POI back to the first POI.

An example of an indication of the first type of user interaction is a leftward finger swipe on the touchscreen 160 over the interactive menu 276. An example of the second type of user interaction is a rightward finger swipe on the touchscreen 160 over the interactive menu 276.

For example, at the point in time at which point in time the "Petro-Canada" gas station is in focus (FIG. 5), in response to the processor 110 receiving an indication of a leftward finger swipe as shown with arrow 314, the processor 110 changes focus from the "Petro-Canada" gas station to the "National History Museum". The resulting state of the GUI 272 is shown in FIG. 6.

On the other hand, if from the point in time at which point in time the "Petro-Canada" gas station is in focus (FIG. 5), the processor 110 receives an indication of a rightward finger swipe, in response the processor 110 changes focus from the "Petro-Canada" gas station to the "ESSO" gas station. The resulting state of the GUI 272 is shown in FIG. 4.

In implementations in which the processor 110 is configured to receive taps over the interactive menu 276, either as the sole kind of user interaction receivable or as an additional kind of user interaction receivable, a single tap over the interactive menu 276 from the point in time depicted in FIG. 5 could refocus the map view 274 from the "Petro-Canada" gas station to the "National History Museum". In such implementations, a double tap over the interactive menu 276 from the point in time depicted in FIG. 5 could refocus the map view 274 from the "Petro-Canada" gas station to the "ESSO" gas station.

In some implementations of the method 800, the first type of user interaction is a finger swipe in one of a left direction and a right direction; and the second type of user interaction is a finger swipe in the other one of the left direction and the right direction. This means that in some implementations, the mapping of which type of user interaction results in which type of coordinated focal response is reversed.

That is to say, in such implementations, a leftward finger swipe could result in coordinated refocusing from a given POI to a sequentially previous POI. For example, in such implementations, a rightward finger swipe over the interactive menu 276 from the point in time depicted in FIG. 5 could result in coordinated refocusing from the "Petro-Canada" gas station to the "National History Museum".

In some implementations of the method 800, the changing of focus from a first POI to a second POI includes moving the map 300 in the map view 274 toward the second POI. For example, when focus is changed from the Petro-Canada" gas station to the "National History Museum", the map 300 is moved in the map view 274 toward the "National History Museum" as can be seen from FIGS. 4 and 5. This is done to position new in-focus POI more centrally in the map view 274 and to thereby make it easier for the user 102 to focus on.

In other non-limiting implementations, changing of focus from the from a first POI to a second POI includes moving the map 300 in the map view 274 such that the second POI becomes centrally positioned in the map view 274.

In the example described herein above, the moving of the map 300 is animated as gradual movement. In other words, the movement of the map 300 takes place over a predetermined time period during which the movement is smooth and visible to the user 102. In other implementations, the moving of the map 300 is simply instantaneous repositioning of the map 300 from its previous position to its subsequent position.

In some implementations of the method 800, the moving the map 300 in the map view 274 toward the second POI is synchronized with the finger swipe that is the first type of user interaction. This means that, for example, where the user 102 performs a finger swipe over a given period of time (for example, within 1 second), the animation of the movement of the map 300 is rendered as smooth movement over the given time period (in this example, over the 1 second).

In some implementations of the method 800, the GUI 272 includes a detour button 606; the map view 274 has displayed thereon a detour 406 from the route 402 to the first POI; and the method 800 further comprises, in response to receiving an indication of a user interaction with the detour button 606 while the first POI is the in-focus one, effecting a modification to the route 402 to include the first POI in the route.

For example, if at the point in time at which point in time the "National History Museum" is in focus (FIG. 6), the processor 110 receives an indication of a tap over the detour button 606, the processor 110 effects a modification to the route 402 to include "National History Museum" therein. The resulting route 402 is shown in FIG. 7.

In some implementations of the method 800, the GUI 272 includes a cancel button 604; and the method 800 further comprises, in response to receiving an indication of a user interaction with the cancel button 604, undoing the modification to the route 402.

For example, if after the processor 110 has effected the abovementioned modification to include "National History Museum" in the route 402 (FIG. 7) the processor 110 receives an indication of a tap over the cancel button 604, the processor 110 reverses the modification thereby modifying the route 402 to its previous state (shown in FIG. 6).

In some implementations of the method 800, the route 402 extends in a first orientation in the map view 274; and the first POI card is positioned in a scrollable row (for example, scrollable row 320 or scrollable row 408) that is scrollable in a second orientation, the second orientation being transverse relative to the first orientation.

For example, in the non-limiting implementation shown in FIGS. 4 to 7 and described herein above, the route 402 extends in a vertical orientation 424 and the scrollable row 408 is scrollable in a horizontal orientation shown by arrow 314.

In other implementations, the route 402 extends in the horizontal orientation and the scrollable row 408 is scrollable in the horizontal orientation. In yet other implementations, the route 402 extends in the horizontal orientation and the scrollable row 408 is scrollable in the vertical orientation 424.

In some implementations of the method 800, the first POI card overlaps a part of the map view 274 in the GUI 272, as shown in FIGS. 4 to 7 for example. In other implementations, the map view 274 and the POI cards are configured to have no overlap with each other. In some implementations, none of the POI cards is transparent. An example of such an implementation is shown in FIG. 3. As shown, in this non-limiting implementation, the first set of POI cards 318 and the interactive menu 276 are non-transparent after the initial geo-search of the user 102 and have no overlap with the map view 274.

In some implementations of the method 800, the first POI card is at least in part transparent such that the part of the map view 274 is visible through the first POI card. An example of this non-limiting implementation is shown in FIGS. 4 to 7. More particularly, once at the point in time depicted in FIG. 3 the map application 270 receives an indication of a user action selecting one of the initial search results to navigate to, the map application 270 retrieves and displays the route 402 to the selected one of the search results and renders the new set of the POI cards 410 for the additional POIs to be displayed in association with the route 402 as shown in FIGS. 4 to 7.

In this non-limiting implementation, the resulting interactive menu 276 and each displayed POI card in the new set of the POI cards 410, are in part transparent and overlap with the map view 274 to show part of the map view 274 therethrough (for example, see FIGS. 4 to 7).

It will be appreciated that in some such implementations, at least some movements of the map 300 that result from a user interaction selecting a particular POI to be the in-focus one of the POIs ("a manually-selected POI") could cause the position of the user 102, shown with arrow 306, to be moved to a position under the interactive menu 276. This is seen in the example shown in FIG. 5 for example. In some such implementations, the map application 270 maintains the manually-selected POI as the in-focus one for a predetermined time period (e.g. 30 seconds), giving the user 102 time to decide whether or not to take a detour to that POI.

Where the predetermined time period runs out and the map application 270 has not received an indication of a user interaction for effecting a modification of the route 402 to include the manually-selected POI therein and the user 102 has not yet advanced along the route 402 past a previous in-focus one of the POIs, the map application 270 refocuses from the manually-selected POI back to the previous in-focus one of the POIs.

On the other hand, where the map application 270 has received an indication of a user interaction within the predetermined time period modifying the route 402 to include the manually-selected POI, the map application 270 modifies the route 402 to include the manually-selected POI and, where necessary, changes the zoom level of the map 300 so as to position the arrow 306 above the interactive menu 276.

In yet other implementations, the map application 270 hides the interactive menu 276 in addition to, instead of, or in combination with the changing of the zoom level of the map 300 in response to the modification of the route 402 to include the manually-selected POI, so as to provide a larger unobstructed map view 274.

In some implementations of the method 800, the method 800 further comprises displaying a position of the user 102 along the route 402; the first POI being a closest POI relative to the position of the user; and the second POI being a next-closest POI relative to the position of the user.

For example, at the point in time depicted in FIG. 4, the first POI is the "ESSO" gas station because it is the closest to the position of the user 102 in terms of driving time, and the "Petro-Canada" gas station is the second POI because it is further away in terms of driving time from the position of the user 102 than the "ESSO" gas station but is closer than the "National History Museum" and all other POIs to be presented along the route 402, again in terms of driving time.

In some implementations of the method 800, the method 800 further comprises determining the closest POI and the next-closest POI based on at least one of: distance and a driving time. That is, in the non-limiting implementations described above, the ranking of the POIs was based on driving time from the user's current location (i.e. the current location of the electronic device 100) to each of the POIs.

In some implementations, the ranking of the POIs is based on driving distance. In other implementations, the ranking of the POIs is based on a combination of a driving time and a driving distance, such as to avoid situations where a driving time to one POI does not differ substantially from a driving time to another POI while the driving distance to the one POI does differ substantially from the driving distance to the other POI.

In some implementations of the method 800, the changing of focus: (i) from the first POI card to the second POI card, and (ii) from the first POI to the second POI is executed simultaneously. In some implementations of the method 800, the changing of focus: (i) from the first POI card to the second POI card, and (ii) from the first POI to the second POI is executed in a synchronized and simultaneous manner.

For example, with regard to the changes of focus shown by FIGS. 4 and 5, the scrolling motion of the first new POI card 412 leftward out of view and the movement of the map 300 from the "ESSO" gas station toward the "Petro-Canada" gas station: a) are initiated at the same time (simultaneous), and b) are completed at the same time while being proportionate to each other between the start and end times (synchronized).

In some implementations, changes of focus are simultaneous but are not synchronized. In some implementations, the changes of focus are not simultaneous but are synchronized.

In some implementations of the method 800, the user interaction that triggers a given response of the map application 270 is a voice command. To this end, a voice-commands button (such as the voice-commands button 304 shown in FIG. 3) could be displayed by the processor 110 in the GUI 272. The processor 110 could receive an indication of a user interaction with the voice-commands button 304, and in response turn on a microphone of the electronic device 100 for receiving an indication of a voice command, the voice command initiating a corresponding response by the map application 270.

As one example, in some implementations of the method 800, the method 800 comprises in response to the receiving an indication of a voice command and prior to the displaying the route 402, displaying, by the processor 110 on the touchscreen 160 in the GUI 272 a confirmation button (such as the confirmation button 312). In some such implementations, the displaying the route 402 is in response to receiving, by the processor 110, an indication of a user interaction with the confirmation button (a confirmatory action) sequentially after the receiving the indication of the voice command.

For example, at a point in time prior to the one depicted in FIG. 3, the user 102 may tap the voice-commands button 304 and request the map application 270 to find and navigate to a POI via a voice command (for example: by stating "navigate to nearest Public Library"). In such a case, the map application 270 could require the user 102 to confirm that they wish to navigate to the in-focus POI (in this example, the "Public Library" at "10 Elm Street") before displaying the route 402 thereto. The user 102 can confirm by tapping the confirmation button 312. In some implementations, the user 102 provide the confirmation via a confirmatory voice command.

In other implementations, the confirmation requesting step is omitted. For example, in some implementations, the displaying the route 402 could be executed immediately in response to the receiving an indication of a corresponding voice command without an intervening confirmatory action being required of the user 102.

As another example of a voice-activated action, at the point in time shown in FIG. 4, the user 102 may tap over the map view 274 to bring up the voice-commands button 304, and may then tap the voice-commands button 304. The user 102 may then pronounce a voice command requesting the map application 270 to refocus on the next-closest POI. In response, the map application 270 would refocus from the "ESSO" gas station (FIG. 4) to the "Petro-Canada" gas station (FIG. 5).

Within the present description it should be understood that transmitting and receiving of certain signals and data are not necessarily mentioned in respect of each place where they occur. This is done to simplify and to maintain clarity of the present description.

Modifications and improvements to the above-described implementations of the present technology may become apparent to those skilled in the art. The foregoing description is intended to provide specific non-limiting implementations of the present technology.

The invention claimed is:

1. A method of receiving a user-command by a processor of an electronic device via a touchscreen of the electronic device, the method executable by the processor, the method comprising:
displaying, by the processor on the touchscreen, a graphical user interface (GUI), the GUI including a map view and an interactive menu displayed in association with the map view,
the map view having displayed thereon:
a map of a geographical area, and
a route along at least a portion of the geographical area, the route having at least two Points of Interest (POIs) sequentially located along the route,
a first POI of the at least two POIs being an in-focus one that is displayed on the map view, and
a second POI of the at least two POIs being an out-of-focus one;
a detour from the route to the first POI;
the interactive menu having displayed thereon:
a first POI card associated with the first POI, the first POI card being changeable with a second POI card, the second POI card being associated with the second POI; and
in response to receiving an indication of a user interaction with the interactive menu, changing of focus:
(i) from the first POI card to the second POI card, and
(ii) from the first POI to the second POI, wherein the changing of focus from the first POI to the second POI including:
moving the map in the map view closer toward the second POI, and removing the detour from the route to the first POI and displaying a new detour from the route to the second POI.

2. The method of claim 1, wherein both the first POI and the second POI are displayed on the map view.

3. The method of claim 2, wherein the first POI is being in-focus by being more prominently highlighted compared to the second POI.

4. The method of claim 1, wherein the interactive menu has displayed thereon both the first POI card and at least a part of the second POI card.

5. The method of claim 1, wherein the first POI card and the second POI card are part of a scrollable row of POI cards, and wherein the indication of the user interaction comprises an indication of the user executing a scrolling action to change the first POI card to the second POI card.

6. The method of claim 5, wherein the scrollable row of POI cards is horizontal.

7. The method of claim 6, wherein:
the user interaction is a first type of user interaction; and
the method further comprises, after the changing of focus from the first POI to the second POI, in response to receiving an indication of a second type of user interaction with the interactive menu,
changing focus from the second POI back to the first POI.

8. The method of claim 7, wherein:
the first type of user interaction is a finger swipe on the touchscreen in one of a left direction and a right direction; and
the second type of user interaction is a finger swipe on the touchscreen in the other one of the left direction and the right direction.

9. The method of claim 1, wherein the moving the map in the map view toward the second POI is synchronized with the finger swipe that is the first type of user interaction.

10. The method of claim 1, wherein:
the GUI includes a detour button;
the method further comprises, in response to receiving an indication of a user interaction with the detour button while the first POI is the in-focus one, effecting a modification to the route to include the first POI in the route.

11. The method of claim 10, wherein:
the GUI includes a cancel button; and wherein
the method further comprises, in response to receiving an indication of a user interaction with the cancel button, undoing the modification to the route.

12. The method of claim 1, wherein:
the route extends in a first orientation in the map view; and
the first POI card is positioned in a scrollable row that is scrollable in a second orientation, the second orientation being transverse relative to the first orientation.

13. The method of claim 1, wherein the first POI card overlaps a part of the map view in the GUI.

14. The method of claim 13, wherein the first POI card is at least in part transparent such that the part of the map view is visible through the first POI card.

15. The method of claim 1, wherein:
the method further comprises displaying a position of the user along the route;
the first POI being a closest POI relative to the position of the user; and
the second POI being a next-closest POI relative to the position of the user.

16. The method of claim 1, wherein the changing of focus:
(i) from the first POI card to the second POI card, and
(ii) from the first POI to the second POI is executed in a synchronized manner.

17. The method of claim 1, further comprising:
displaying, by the processor on the touchscreen in the GUI a voice-commands button; and
receiving an indication of a user interaction with the voice-commands button and sequentially thereafter an indication of a voice command requesting navigation to a given POI; and wherein,
the displaying the route is in response to the receiving the indication of the voice command, the route ending at the given POI.

18. The method of claim 17, further comprising:
in response to the receiving the indication of the voice command and prior to the displaying the route, displaying, by the processor on the touchscreen in the GUI a confirmation button; and wherein,
the displaying the route is in response to receiving, by the processor, an indication of a user interaction with the confirmation button sequentially after the receiving the indication of the voice command.

19. An electronic device comprising:
a processor, and
a memory accessible by the processor,
the memory storing computer executable instructions, which instructions when executed cause:
displaying, by the processor on the touchscreen, a graphical user interface (GUI), the GUI including a map view and an interactive menu displayed in association with the map view,
the map view having displayed thereon:
a map of a geographical area, and
a route along at least a portion of the geographical area, the route having at least two Point of Interests (POIs) sequentially located along the route,
a first POI of the at least two POIs being an in-focus one that is displayed on the map view, and
a second POI of the at least two POIs being an out-of-focus one;
a detour from the route to the first POI;
the interactive menu having displayed thereon:
a first POI card associated with the first POI, the first POI card being changeable with a second POI card, the second POI card being associated with the second POI; and
in response to receiving an indication of a user interaction with the interactive menu, changing of focus:
(i) from the first POI card to the second POI card, and
(ii) from the first POI to the second POI, wherein the changing of focus from the first POI to the second POI including:
moving the map in the map view closer toward the second POI, and
removing the detour from the route to the first POI and displaying a new detour from the route to the second POI.

* * * * *